United States Patent [19]

Weaver

[11] Patent Number: 4,996,808
[45] Date of Patent: Mar. 5, 1991

[54] ENCAPSULATED WINDOW ASSEMBLY

[75] Inventor: William R. Weaver, Toledo, Ohio

[73] Assignee: Libbey-Owens-Ford Co., Toledo, Ohio

[21] Appl. No.: 317,438

[22] Filed: Mar. 1, 1989

Related U.S. Application Data

[62] Division of Ser. No. 98, Jan. 2, 1987, Pat. No. 4,830,804.

[51] Int. Cl.$^5$ .............................................. E06B 3/00
[52] U.S. Cl. .................................... 52/208; 296/96.21; 52/474
[58] Field of Search ................. 52/208, 400, 474, 716; 296/96.21, 201

[56] References Cited

U.S. PATENT DOCUMENTS

| | | | |
|---|---|---|---|
| 1,961,352 | 6/1934 | Hall | 296/201 X |
| 4,072,346 | 2/1978 | Morgan | 52/208 X |
| 4,364,595 | 12/1982 | Morgan et al. | 52/208 X |
| 4,621,469 | 11/1986 | Kruschwitz | 52/208 |
| 4,627,201 | 12/1986 | Hamamoto et al. | 296/96.21 X |
| 4,662,113 | 5/1987 | Weaver | 49/441 X |
| 4,712,341 | 12/1987 | Harris, Jr. et al. | 296/96.21 X |
| 4,765,673 | 8/1988 | Frabotta et al. | 296/96.21 X |
| 4,813,733 | 3/2198 | Gustafson et al. | 52/400 X |
| 4,830,804 | 5/1989 | Weaver | 264/139 |

Primary Examiner—David A. Scherbel
Assistant Examiner—Creighton Smith
Attorney, Agent, or Firm—Marshall & Melhorn

[57] ABSTRACT

An insert which forms the show or finish surface (this surface exposed to the weather) for an elastomeric gasket in an encapsulated window assembly is thermo formed from a sheet of plastic and placed in the lower half of a mold. A sheet of glazing material is also placed in the lower mold half and an upper mold half is utilized to close the mold cavity. Gasket forming material is injected into the mold cavity to form a gasket in situ which adheres to both the peripheral marginal areas of the transparent sheet and the insert. The insert can be formed with a gate portion which extends into the gate area of the mold and prevents the gasket forming material from flowing onto the surface of the insert which is to be exposed in the final glazing. In one embodiment, the insert can be formed in its final configuration with a central opening leaving the transparent sheet exposed. In an alternate embodiment, the insert is formed with a centrally disposed portion which covers the transparent sheet material to protect it. A groove can be formed in the insert to facilitate removal of the central portion.

11 Claims, 2 Drawing Sheets

ENCAPSULATED WINDOW ASSEMBLY

This is a division of application Ser. No. 07/000,098, filed Jan. 2, 1987, now U.S. Pat. No. 4,830,804.

BACKGROUND OF THE INVENTION

The present invention relates generally to encapsulated glazing products comprising a plastic frame or gasket member surrounding peripheral regions of a glass sheet and, in particular, to a preformed, molded-in-place, insert for providing, i.e. forming, the exposed (to the elements) surface portion of the encapsulating frame member of the glazing.

Initially, fixed window assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed These assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly, since the individual components required to produce each window assembly generally must be manually assembled.

In a further development, single sheets of glass and laminated glass assemblies have been formed with integral frame or gasket members molded by a reaction injection molding (RIM) process. U.S. Pat. No. 4,561,625 to W. R. Weaver, commonly assigned with this application, is illustrative of such a process and resulting product and is incorporated herein by reference. Such an assembly can be readily attached to the material defining the periphery of a window opening, for example, during the manufacture of a vehicle. Typically, the frame or gasket member is formed of a polyurethane material which is subject to degradation from exposure to ultraviolet radiation normally present in unfiltered sunlight. Thus, the gasket material is coated, for example, with a urethane based U.V. absorbing paint after the window assembly has been formed. Such a process adds cost to the window assembly due to the additional time and materials involved in the extra painting step and including masking of those surfaces not intended to be painted, such as the glass.

SUMMARY OF THE INVENTION

The present invention involves an encapsulated window assembly wherein a preformed sheet of plastic material is placed in the mold prior to the gasket forming process. The sheet integrally adheres to the gasket material and functions as a molded-in-place protective layer or surface against the effects of ultraviolet radiation. The sheet of plastic material can be clear and formed of an ultraviolet filtering material, or can be pigmented or colored to coordinate with the vehicle into which it is to be assembled. The sheet is also formed with a gate portion to prevent the flow of the gasket forming material under the sheet between the sheet and the mold surface during the molding step.

In an alternate embodiment, the preformed sheet also covers the glass sheet and this portion can either be removed after the molding step or removed at any subsequent time up to the time at which the vehicle is delivered to its new owner.

It is an object of the present invention to produce a window assembly having an encapsulated frame or gasket ready for installation in a vehicle window opening.

It is another object of the present invention to produce an encapsulated window assembly at a reduced cost.

BRIEF DESCRIPTION OF THE DRAWINGS

The above as well as other objects of the invention will become apparent to one skilled in the art from reading the following detailed description of a preferred embodiment of the invention when considered in the light of the attached drawings, in which.

DESCRIPTION OF THE PREFERRED EMBODIMENT

Figure 1:
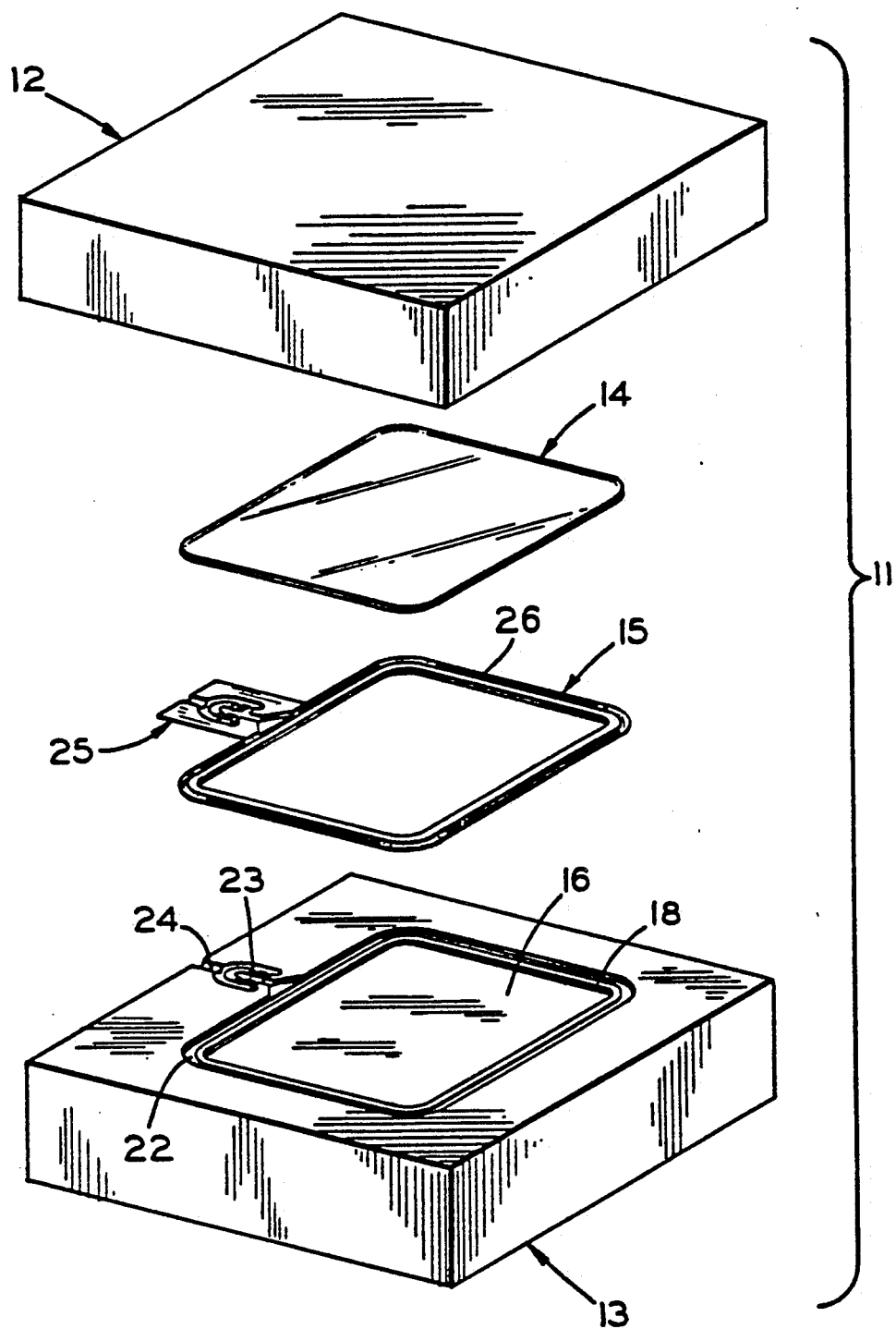
FIG. 1 is an exploded perspective view of a gasket forming mold, a window glass pane and a preformed surface forming insert according to the present invention.

It should be noted that while the embodiments of the invention illustrated in the drawings and described herein concern a window assembly having a single sheet of glass, it will be appreciated that the invention can be readily incorporated in a window assembly consisting of a laminated composite employing two or more sheets of glass. Also, while the preferred embodiment of the invention is described as a vehicle window, it will be appreciated that the assembly may also be advantageously employed as a vehicle windshield or roof panel, or as a window in a building structure. Further, it will be understood that the glass sheet material can also be replaced by plastic sheet material to evolve a product having many of the same inherent advantages.

Figure 2:
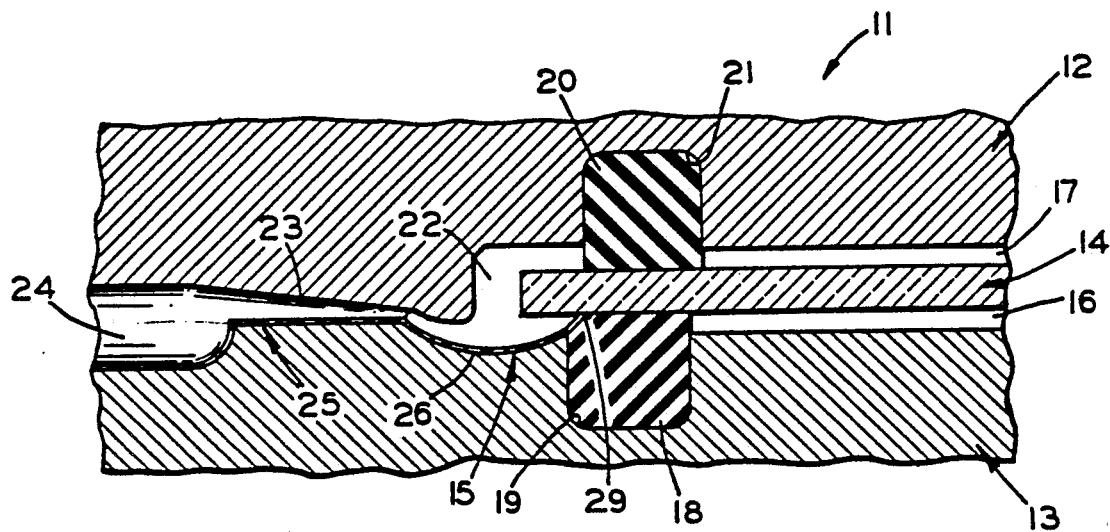
FIG. 2 is an enlarged, fragmentary sectional view of the mold, glass and insert of FIG. 1.

Referring to FIGS. 1 and 2, there is shown a mold and window assembly 11 including an upper mold half 12, a lower mold half 13, a sheet 14 of transparent material such as glass and a preformed gasket surface forming insert 15 according to the present invention. The glass sheet 14 is initially formed into the desired shape to conform with the sheet metal of the vehicle into which the window assembly is to be installed. According to the prior art method of manufacturing, for example a RIM encapsulated glazing as illustrated in the aforementioned Weaver patent, the sheet of glass 14 would be positioned in a mold cavity 16 formed in the lower mold half 13 and covered by the upper mold half 12 which has a corresponding mold cavity 17 formed therein. While the mold sections 12 and 13 are typically formed, for example, of a metallic material such as steel or aluminum, other types of substantially non-resilient material can be used. Suitable means, not shown, are provided to open and close the mold halves 12 and 13. Each of the mold halves 12 and 13 can also be provided with passageways, not shown, for circulating a suitable coolant therethrough.

The mold cavities 16 and 17, when the mold halves are closed, cooperate to define a chamber for receiving the glass sheet 14 on which a gasket is to be formed. Typically, the glass sheet is positioned so that the outer peripheral portion of the lower surface thereof rests on a lower seal 18 positioned within a groove 19 formed in the upper surface of the lower section 13. After the glass sheet 14 is suitably positioned on the seal 18, the upper mold section 12 is lowered into position to enable the outer peripheral portions of the facing surfaces of the cooperating mold sections 12 and 13 to be clamped in metal-to-metal contact. The upper mold section 12 carries an upper seal 20 positioned in a groove 21 formed opposite the groove 19. The upper seal 20 cooperates with the lower seal 18 to press yieldingly against the glass sheet 14 to effectively resiliently support the glass sheet within the chamber formed by the mold cavities 16 and 17.

As shown, the chamber formed by the mold cavities 16 and 17 is slightly larger than the glass sheet 14 to avoid any glass-to-metal contact between the sheet and the mold sections 12 and 13. However, it will be appreciated that the chamber formed by the mold cavities can be formed of any shape as long as the chamber is sufficiently large to avoid any glass-to-metal contact between the glass sheet and the metallic mold sections. For example, the portions of the mold sections 12 and 13 which are below and above the central portion of the glass sheet can be removed such that each mold section will be generally ring-shaped.

The seals 18 and 20 may be formed of a silicone rubber material and can be secured within the respective grooves 19 and 21 by means of a suitable adhesive. Alternatively, the seals 18 and 20 can be releasably secured within the respective grooves. This can be accomplished by providing tab portions (not shown) at spaced apart locations around the respective seal which can be inserted and releasably held within corresponding tab receiving apertures (not shown) formed at corresponding spaced apart locations around the respective groove.

In addition to supporting the glass sheet 14 within the chamber, the seals 18 and 20 cooperate with selected portions of the glass sheet and the mold sections 12 and 13 for defining a gasket forming cavity 22 utilized to form an encapsulating gasket. The cavity 22 communicates with a gate 23 and an inlet means 24 for receiving a flowable polymeric gasket forming material from an associated nozzle member (not shown). Typically, the gasket forming material is adapted to polymerize and cure in situ on the peripheral portion of the glass sheet 14 by a process generally referred to as a reaction injection molding process, wherein the gasket assumes through the autogenous mechanism incident to its polymerization and cure while confined, intimate contact with the portions of the sheet and insert to which it is adhered.

It has been found desirable to apply a coating to the surface of the gasket adapted to form the outer exposed surface thereof when the window assembly is installed in a vehicle. The coating can be a urethane base paint which may then be baked at approximately 140°–150° F. for about twenty to thirty minutes. The coating is employed to protect the exposed gasket materials from degradation which would otherwise be caused by exposure to ultraviolet radiation normally present in unfiltered sunlight. Typically, the gasket is formed of a polyurethane material.

The insert 15 according to the present invention is utilized to eliminate the need for a U.V. protective coating and the associated manufacturing steps. The painted coating must be applied in a separate step after the gasket has been formed on the glass sheet and then another step must be employed to cure or dry the paint. Such painting also requires the masking of the surface of the glass sheet 14 and the subsequent removal of such mask.

According to the present invention, the insert 15 is composed of a preformed sheet of plastic material. A thermo forming process, e.g., pressure or vacuum forming, can be utilized to contour the plastic sheet 15 to snuggly fit the mold cavity 22 in the lower mold section 13. In this connection, the inner end of the insert may terminate at the juncture of the glass and seal 18 or extend a short distance therebeyond, e.g., up to 0.1 mm, along the glass surface as shown at 29. Additionally, the insert 15 preferably includes a gate portion 25 which follows the contours of the gate section 23 and inlet section 24 formed in the lower mold section 13. The portion 25 prevents the gasket forming material from penetrating underneath the insert outwardly of the seal 18, i.e., entering the mold cavity 22 between the insert 15 and the lower mold surface. If this were to happen, the insert could float causing the injected gasket forming material to bond to the outboard surface of the insert, destroy the intended exposed surface configuration of the gasket, and result in a scrap part.

Figure 3:
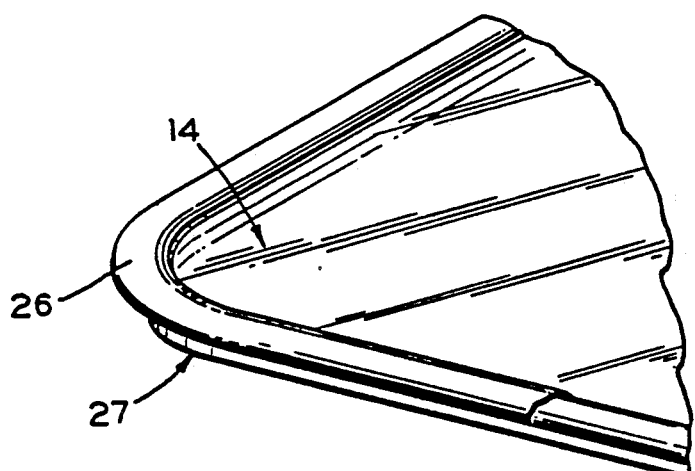
FIG. 3 is an enlarged, fragmentary perspective view of the molded window assembly in accordance with the present invention.

As shown in FIG. 3, the insert 15 after for example the RIM gasket molding procedure and removal of the gate portion 25 by trimming forms a surface layer 26 adhered to and integral with the surface of the gasket 27 adapted to form the outer exposed surface thereof about the periphery of the glass sheet 14.

Figure 4:
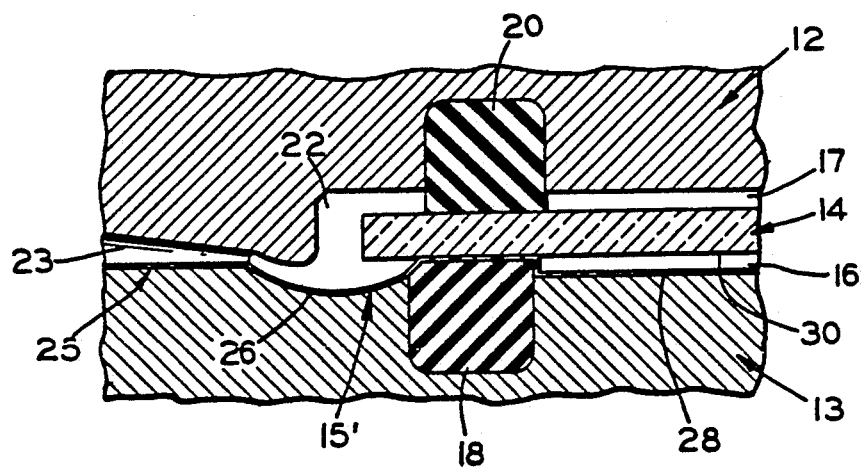
FIG. 4 is an enlarged, fragmentary sectional view of a mold, glass sheet and insert in an alternate embodiment of the present invention.

In FIG. 4, there is shown an alternate embodiment of the insert 15 of FIG. 1. The mold halves 12 and 13 include the cavities 17 and 16 respectively and retain the glass sheet 14 between the lower seal 18 and the upper seal 20. Also shown is the gasket forming cavity 22 and the gate area 23. An insert 15', according to the alternate embodiment of the present invention, includes the gate portion 25 and the gasket surface forming layer 26 as shown in FIG. 2. However, the insert 15' includes a central portion 28 which is coextensive with the glass sheet surface 30 inwardly of the seal 18. This portion 28 protects the surface 30 of the glass sheet 14 during handling, assembly and shipping after which it must be removed. As an aid in removing the portion 28, a line or groove between the portions 26 and 28 at the predetermined point where the insert will extend past the seal 18 and enter the cavity 16 can be precut partially through the insert 15.

The insert 15, 15' can be formed of any U.V. stable material which is compatible with the gasket forming resin and capable of forming an integral bond therewith. Synthetic resins which can be thermo formed are advantageously employed, with polyvinyl chloride being the preferred material. Insert thickness in the range of 0.001 to 0.01 mil. are preferred. Also, the insert can be formed of a clear material which filters ultraviolet rays or of a colored or pigmented material to coordinate with the color of the vehicle in which it is installed.

Other advantages of the use of the inserts 15, 15' in the production of encapsulated glazing units by the RIM process as herein disclosed are the facts that they function to keep that portion of the lower seal forming a part of the mold cavity 22, clean, i.e., free from gasket forming material adhering thereto, and also prevent leakage of the urethane between the seal 18 and the groove 19 in the mold section 13. This often happens in processing without the inserts and requires frequent cleaning of the seal between shots and flash removal from the glazing.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A window assembly of transparent sheet material and an encapsulating gasket comprising:
    a sheet of transparent material;
    a gasket adhered to predetermined peripheral portions of said sheet of transparent material; and
    an insert formed of a plastic material adhered to a predetermined surface portion of said gasket, said gasket having been polymerized and cured in situ in contact with said sheet and said insert and having assumed through the autogenous mechanism incident to this polymerization and cure, while confined, intimate contact with portions of said sheet and said insert to which it is adhered.

2. The assembly according to claim 1, wherein said sheet of transparent material is glass.

3. The assembly according to claim 1, wherein said sheet is a laminated glass composite.

4. The assembly according to claim 1, wherein said gasket is formed of an elastomeric material.

5. The assembly according to claim 4, wherein said elastomeric material is a polyurethane material.

6. The assembly according to claim 1, wherein said plastic material is polyvinyl chloride.

7. The assembly according to claim 1, wherein said plastic material is effective to filter a substantial portion of the ultraviolet radiation from incident sunlight and prevent said radiation from penetrating to said gasket.

8. The assembly according to claim 1, wherein said plastic material is colored or pigmented.

9. The assembly according to claim 1, wherein said insert has a first portion adhered to a predetermined surface portion of said gasket and a second portion covering and coextensive with an adjacent surface of said sheet.

10. The assembly according to claim 7, wherein said insert includes a groove formed adjacent the junction of said first and second portions.

11. The assembly according to claim 1, wherein said insert has a gate portion formed thereon.

* * * * *

UNITED STATES PATENT AND TRADEMARK OFFICE
CERTIFICATE OF CORRECTION

PATENT NO. : 4,996,808

DATED : March 5, 1991

INVENTOR(S) : William R. Weaver

It is certified that error appears in the above-identified patent and that said Letters Patent is hereby corrected as shown below:

On the title page:
In the abstract:

Line 1, "this" should be --the--.

Column 1, line 28, --.-- (period) should be inserted after the word "developed".

Column 6:

Claim 10, line 27, "claim 7" should be --claim 9--.

Signed and Sealed this

Sixth Day of October, 1992

*Attest:*

DOUGLAS B. COMER

*Attesting Officer*  Acting Commissioner of Patents and Trademarks